United States Patent
Myers et al.

(10) Patent No.: US 7,472,466 B2
(45) Date of Patent: Jan. 6, 2009

(54) MODULAR CAB, SLEEPER AND ROOF STRUCTURAL ASSEMBLY FOR A TRUCK-TRACTOR VEHICLE

(75) Inventors: Linton David Myers, Lenhartsville, PA (US); David Scott Adams, Macungie, PA (US); Roland Pierre Moriaux, Francheville (FR); Bernard Nigay, Villeurbanne (FR)

(73) Assignee: Mack Trucks, Inc., Allentown, PA (US)

( * ) Notice: Subject to any disclaimer, the term of this patent is extended or adjusted under 35 U.S.C. 154(b) by 433 days.

(21) Appl. No.: 11/177,280

(22) Filed: Jul. 11, 2005

(65) Prior Publication Data

US 2005/0242622 A1  Nov. 3, 2005

Related U.S. Application Data

(62) Division of application No. 10/653,290, filed on Sep. 3, 2003, now Pat. No. 6,935,679.

(51) Int. Cl.
  *B21D 39/03* (2006.01)
  *B23Q 3/00* (2006.01)
  *B23P 21/00* (2006.01)
  *B60J 7/00* (2006.01)

(52) U.S. Cl. ............... 29/469; 29/453; 29/566; 296/190.02; 296/190.05; 296/190.06; 296/190.08

(58) Field of Classification Search .................. 29/428, 29/453, 466, 469; 296/190.02, 190.08, 190.05, 296/190.06
See application file for complete search history.

(56) References Cited

U.S. PATENT DOCUMENTS

| | | | |
|---|---|---|---|
| 1,384,269 A | 7/1921 | Milner | |
| 1,387,083 A | 8/1921 | Welch | |
| 1,710,252 A | 4/1929 | Ziegler | |
| 1,728,670 A | 9/1929 | Masury | |
| 1,728,876 A | 9/1929 | Masury | |

(Continued)

FOREIGN PATENT DOCUMENTS

AU  B-37103/84  7/1985

(Continued)

*Primary Examiner*—David P Bryant
*Assistant Examiner*—Alexander P Taousakis
(74) *Attorney, Agent, or Firm*—Martin Farrell

(57) ABSTRACT

A modular cab/sleeper/roof structural assembly for a truck-tractor vehicle according to the present invention provides greater manufacturing flexibility and unrestricted access between a cab/sleeper unit. The structural assembly includes a top-free cab unit having a front wall, opposing side walls, and a bottom portion. A top-free sleeper unit positioned behind the cab unit has a rear wall, opposing side walls, and a bottom portion. Fasteners couple the cab unit and the sleeper unit such that an upwardly opened carriage assembly is formed. A unitary roof member fixedly encloses the opened carriage assembly and forms an integral modular unit. The unitary roof member has a front portion connected to the front wall of the cab unit, a rear portion connected to the rear wall of the sleeper unit, and opposing side portions connected to the opposing side walls of the cab and sleeper units. The cab unit, sleeper unit and roof member are not independent structures; however, when they are assembled, the units constitute a durable cab/sleeper unit.

3 Claims, 6 Drawing Sheets

U.S. PATENT DOCUMENTS

| | | | |
|---|---|---|---|
| 1,841,992 A | 1/1932 | Thompson | |
| 1,894,356 A | 1/1933 | Lewis | |
| 2,311,129 A | 2/1943 | Renno | |
| 2,472,185 A | 6/1949 | Apel | |
| 2,816,794 A | 12/1957 | Temp | |
| 2,857,977 A | 10/1958 | Bock | |
| 3,000,665 A | 9/1961 | Reeves | |
| 3,006,001 A | 10/1961 | Llewellyn | |
| 3,249,382 A | 5/1966 | Swithenbank | |
| 3,321,236 A | 5/1967 | Sewelin | |
| 3,485,522 A | 12/1969 | Reinarts | |
| 3,554,596 A | 1/1971 | Le Fevre | |
| 3,588,168 A | 6/1971 | Froitzheim | |
| 3,652,121 A | 3/1972 | Hjelm | |
| 3,825,295 A | 7/1974 | Saunders et al. | |
| 3,857,602 A | 12/1974 | Karkau et al | |
| 3,879,081 A | 4/1975 | Hockley et al. | |
| 3,882,956 A | 5/1975 | Plegat | |
| 3,935,920 A | 2/1976 | Schiel | |
| 3,966,009 A | 6/1976 | Meacock, II et al. | |
| 4,036,519 A | 7/1977 | Servais et al. | |
| 4,050,735 A | 9/1977 | Molnar | |
| D248,856 S | 8/1978 | Stage et al. | |
| 4,121,684 A | 10/1978 | Stephens et al. | |
| 4,203,499 A | 5/1980 | Miyata | |
| 4,215,899 A | 8/1980 | Schmidt et al. | |
| 4,221,426 A | 9/1980 | Wardill | |
| 4,276,953 A | 7/1981 | Penzotti et al. | |
| 4,351,554 A | 9/1982 | Miller | |
| 4,410,056 A | 10/1983 | Pound et al. | |
| 4,422,685 A | 12/1983 | Bonfilio et al. | |
| 4,438,825 A | 3/1984 | Stephens | |
| 4,438,970 A | 3/1984 | Boucher | |
| 4,452,329 A | 6/1984 | Stone et al. | |
| 4,511,175 A | 4/1985 | Gelleneck | |
| 4,527,828 A | 7/1985 | Groce et al. | |
| 4,605,257 A | 8/1986 | Lang et al. | |
| 4,632,457 A | 12/1986 | Hofrichter et al. | |
| 4,643,468 A | 2/1987 | Oen | |
| 4,658,470 A | 4/1987 | Oen | |
| 4,664,438 A | 5/1987 | Crepaldi | |
| 4,669,563 A | 6/1987 | Kerney | |
| D291,872 S | 9/1987 | Simons et al. | |
| 4,775,179 A | 10/1988 | Riggs | |
| 4,787,670 A | 11/1988 | Bentz | |
| D299,706 S | 2/1989 | Whitmer et al. | |
| 4,813,736 A | 3/1989 | Schubert et al. | |
| 4,832,404 A | 5/1989 | Baymak et al. | |
| 4,842,326 A | 6/1989 | DiVito | |
| 4,871,189 A | 10/1989 | Van Breemen | |
| 4,917,435 A | 4/1990 | Bonnett et al. | |
| 4,921,062 A | 5/1990 | Marlowe | |
| 4,932,716 A | 6/1990 | Marlowe et al. | |
| 4,972,913 A | 11/1990 | Ray et al. | |
| D312,805 S | 12/1990 | Marlowe et al. | |
| 4,978,163 A | 12/1990 | Savio | |
| 4,998,592 A | 3/1991 | Londt et al. | |
| 5,004,062 A | 4/1991 | Foot | |
| 5,029,929 A | 7/1991 | Sjostrom et al. | |
| D319,807 S | 9/1991 | Simons et al. | |
| D320,583 S | 10/1991 | Simons et al. | |
| 5,076,639 A | 12/1991 | Jewett et al. | |
| 5,083,834 A | 1/1992 | Moffatt et al. | |
| 5,130,239 A | 7/1992 | Hara et al. | |
| D329,214 S | 9/1992 | Marlowe et al. | |
| 5,150,942 A | 9/1992 | Fujan et al. | |
| 5,159,746 A | 11/1992 | Saggese | |
| 5,201,379 A | 4/1993 | Penzotti et al. | |
| 5,205,587 A | 4/1993 | Orr | |
| 5,310,239 A | 5/1994 | Koske et al. | |
| 5,516,179 A | 5/1996 | Tidwell | |
| 5,560,673 A | 10/1996 | Angelo | |
| 5,638,560 A | 6/1997 | Rigdon et al. | |
| 5,735,568 A | 4/1998 | Arnold | |
| 5,769,486 A | 6/1998 | Novoa et al. | |
| 5,984,404 A | 11/1999 | Novoa et al. | |
| 6,076,884 A | 6/2000 | Osman | |
| 6,213,531 B1 | 4/2001 | Corey et al. | |
| 6,308,411 B1 * | 10/2001 | Wright et al. | 29/897.2 |
| 6,389,698 B1 * | 5/2002 | Malatier | 29/897.2 |
| 6,625,860 B1 * | 9/2003 | Gernstein | 29/401.1 |
| 6,682,129 B2 | 1/2004 | Baggett et al. | |
| 6,769,732 B2 * | 8/2004 | Sakyo | 296/190.03 |

FOREIGN PATENT DOCUMENTS

| | | |
|---|---|---|
| CA | 985337 | 3/1976 |
| GB | 1 549 901 A | 1/1979 |
| GB | 2 166 094 A | 4/1986 |
| WO | WO 94/19229 A1 | 9/1994 |

\* cited by examiner

MODULAR CAB, SLEEPER AND ROOF STRUCTURAL ASSEMBLY FOR A TRUCK-TRACTOR VEHICLE

CROSS-REFERENCE TO RELATED APPLICATION

This application is a divisional of U.S. application Ser. No. 10/653,290, filed Sep. 3, 2003.

BACKGROUND OF THE INVENTION

1. Field of the Invention

The present invention relates, generally, to truck-tractor vehicles having cab and sleeper assemblies and, more particularly, to a modular cab, sleeper and roof structural assembly for a truck-tractor vehicle.

2. Description of the Background Art

Truck-tractor vehicles are known to have sleeper units for providing sleeping accommodations for truck operators. The truck-tractor vehicle is operated from a cab unit which is positioned in front of the sleeper unit. Generally, the sleeper unit is manufactured integrally with the cab unit ("integral assembly"), or alternatively, the sleeper and cab units are separate ("modular assembly").

Integral assemblies are configured with a sleeper unit and cab unit in a single structure. Access between the sleeper unit and cab unit can be limited and restricted to a manufacturing technician or assembly worker. Since the sleeper and cab units are provided in a single structure, the sleeper unit cannot be replaced or removed from the cab unit.

Modular assemblies consisting of separate sleeper and cab units are individually mounted to a truck chassis (e.g., the cab unit is mounted to the chassis and then the sleeper unit is mounted to the chassis). Sleeper and cab units can also be mounted to each other with a subframe underneath. Access between the sleeper and cab units is provided through an opening in a front wall of the sleeper unit and a back wall of the cab unit. The sleeper and cab units are connected by coupling fasteners, such as fasteners, brackets and/or beam members. While the modular assembly allows the sleeper unit to be replaced or removed from the cab unit, the coupling fasteners between the sleeper and cab units can reduce the available usable interior volume.

U.S. Pat. No. 5,310,239 (Koske et al.) discloses such a cab/sleeper modular assembly, which is incorporated herein by reference. The sleeper and cab units of the '239 patent have sleeper and cab structural assemblies that provide stability and rigidity to the sleeper and cab units, respectively. The sleeper structural assembly includes a sleeper frame network and a sleeper exterior skin portion. The cab structural assembly includes a cab frame network and a cab exterior skin portion. The sleeper and cab structural assemblies are connected together via upper and lower brackets, which are mounted on the front and back walls of the sleeper and cab structural assemblies, respectively. Accordingly, the modular cab and sleeper structural assembly provides relatively restricted access between the sleeper and cab units.

Thus, there is a need for a modular cab/sleeper/roof structural assembly for a truck-tractor vehicle that has greater manufacturing flexibility and unrestricted access between a cab/sleeper unit.

SUMMARY OF THE INVENTION

In accordance with the present invention, a modular cab/sleeper/roof structural assembly is provided for a truck-tractor vehicle comprising a top-free cab unit having a front wall, opposing side walls, and a bottom portion. A top-free sleeper unit positioned behind the cab unit has a rear wall, opposing side walls, and a bottom portion. Fasteners couple the cab unit and the sleeper unit such that an upwardly opened carriage assembly is formed. A unitary roof member fixedly encloses the opened carriage assembly and forms an integral modular unit. The unitary roof member has a front portion connected to the front wall of the cab unit, a rear portion connected to the rear wall of the sleeper unit, and opposing side portions connected to the opposing side walls of the cab and sleeper units.

A method of assembling a top-free cab unit, a top-free sleeper unit and a roof member to form a modular cab/sleeper/roof structural assembly for a truck-tractor vehicle is also provided. The method includes aligning an open rear portion of the cab unit with an open front portion of the sleeper unit, joining the aligned cab unit and sleeper unit to form an upwardly opened carriage assembly, enclosing the upwardly opened carriage assembly with the roof member, and joining the opened carriage assembly and the roof member to form an integral modular unit.

BRIEF DESCRIPTION OF THE DRAWINGS

The accompanying drawings, which are incorporated herein and form part of the specification, illustrate various embodiments of the present invention and, together with the description, further serve to explain the principles of the invention and to enable a person skilled in the pertinent art to make and use the invention. In the drawings, like reference numbers indicate identical or functionally similar elements. A more complete appreciation of the invention and many of the attendant advantages thereof will be readily obtained as the same becomes better understood by reference to the following detailed description when considered in connection with the accompanying drawings, wherein.

DETAILED DESCRIPTION OF THE EXEMPLARY EMBODIMENTS

The modular cab/sleeper/roof structural assembly for a truck-tractor vehicle of the present invention provides greater manufacturing flexibility and unrestricted access between the cab/sleeper unit. While the present invention will be described with reference to specific embodiments, the description is merely illustrative of the invention and is not to be construed as limiting the invention. Various modifications to the present invention can be made to the exemplary embodiments by those skilled in the art without departing from the true spirit and scope of the invention as defined by the appended claims.

Figure 1:
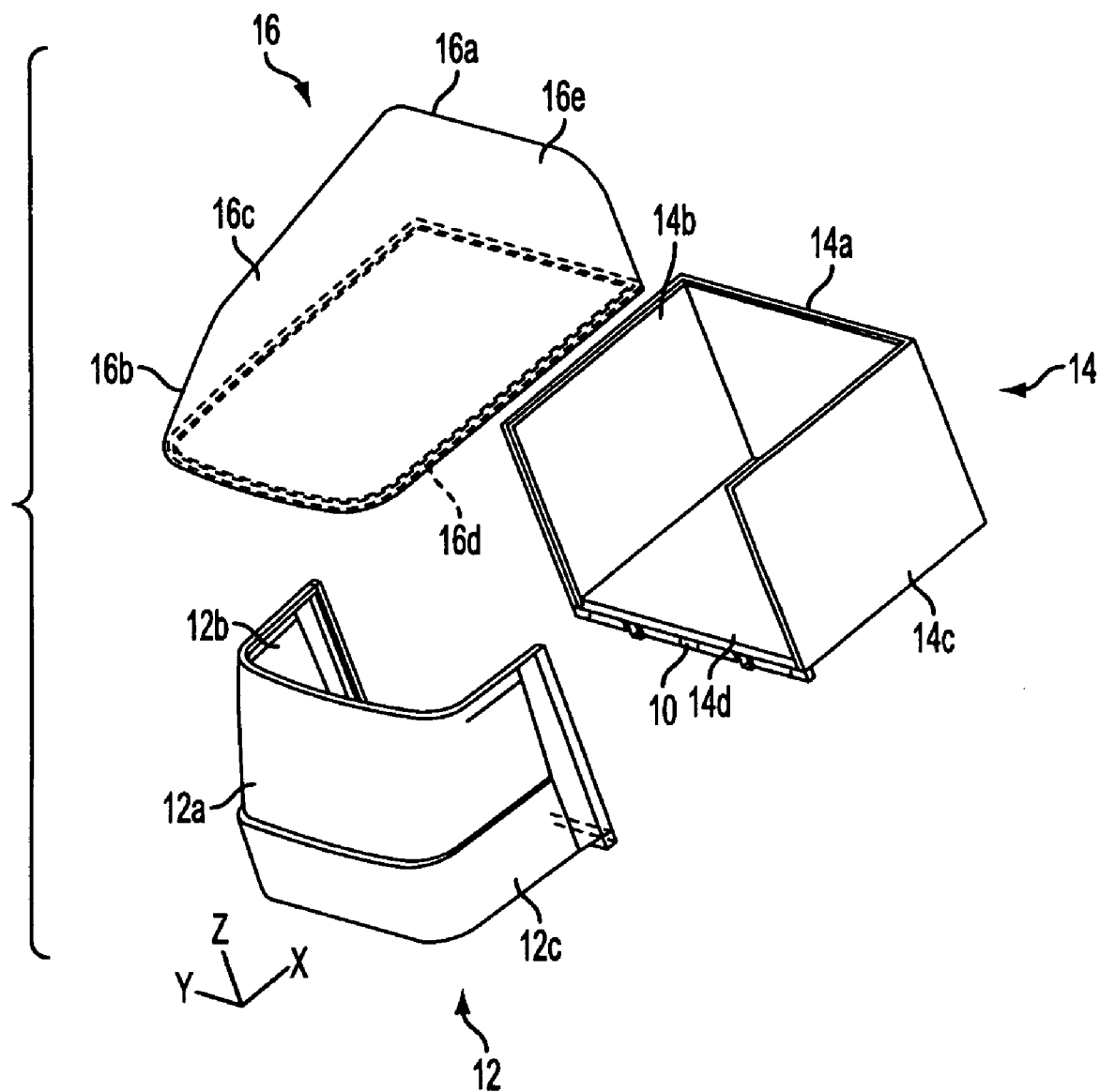
FIG. 1 is an exploded view of a modular cab/sleeper/roof structural assembly illustrating an exemplary embodiment of the present invention.

It should be noted that like components are denoted by like reference symbols throughout the various figures. FIG. 1 is an exploded view of a modular cab/sleeper/roof structural assembly for a truck-tractor vehicle according to the present invention. Referring to FIG. 1, the cab module 12 having neither a top portion nor a rear wall, and a sleeper module 14 having neither a top portion nor a front wall are coupled together to form an upwardly opened carriage assembly. A unitary roof member 16 having no bottom portion fixedly encloses the upwardly opened carriage assembly to form an integral modular unit, such that access between the cab module 12 and sleeper module 14 is unrestricted, and the sleeper module 14 can be easily removed and reattached to the cab module 12. The modular cab/sleeper/roof structural assembly for a truck-tractor vehicle according to the present invention provides the structural and dynamic ride advantages of an integral assembly while maintaining a modular design.

More particularly, the cab module 12 has a front wall 12a, opposing side walls 12b, 12c, and a bottom portion (not shown). The cab module 12 is not an independent structure. The sleeper module 14, which is positioned behind the cab module 12, has a rear wall 14a, opposing side walls 14b, 14c, and a bottom portion 14d. Similarly, the sleeper module 14 is not an independent structure. The roof member 16 has a top portion 16a, a front portion 16b, opposing side portions 16c, 16d, and a rear portion 16e, and the roof member 16 is not an independent structure. The assembly of each component to each other provides a stable and rigid cab/sleeper structure with the ride benefits and unrestricted driver access of an integral cab/sleeper design.

Figure 2:
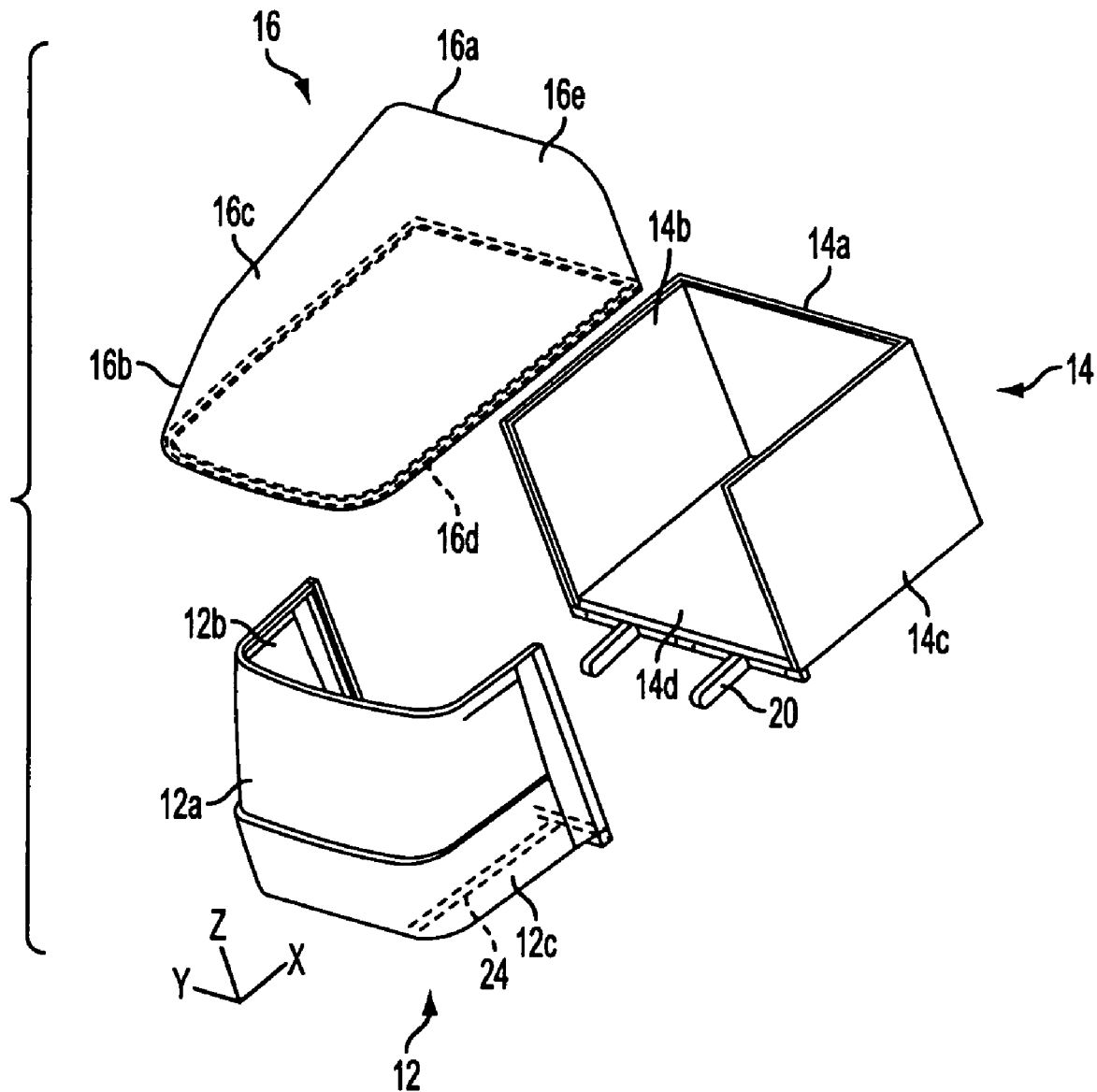
FIG. 2 is an exploded view of a modular cab/sleeper/roof structural assembly illustrating a second exemplary embodiment of the present invention.

As shown in FIG. 1, the sleeper module 14 is provided with flush sills 10, and as shown in FIG. 2, the sleeper module is provided with extended sills 20. The flush sill arrangement allows for more flexibility during the assembly of the sleeper module 14 to the cab module 12. Without the extended sill 20 protruding from the sleeper module 14, the sleeper module 14 can be aligned to the cab module 12 with less complex motions during the assembly process.

Figure 3A:
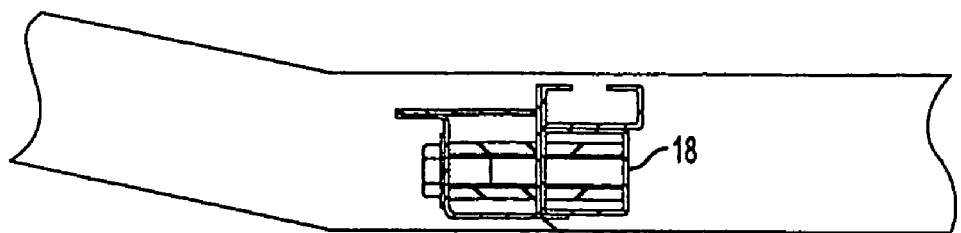
FIGS. 3A and 3B show the assembly of the cab module and sleeper module of the modular cab/sleeper/roof structural assembly according to the present invention.
Figure 3B:
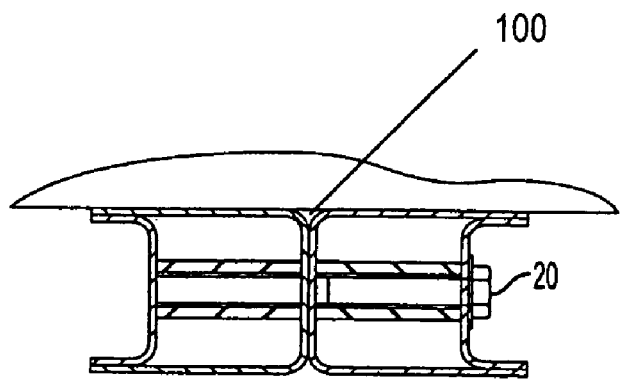
Figure 3C:
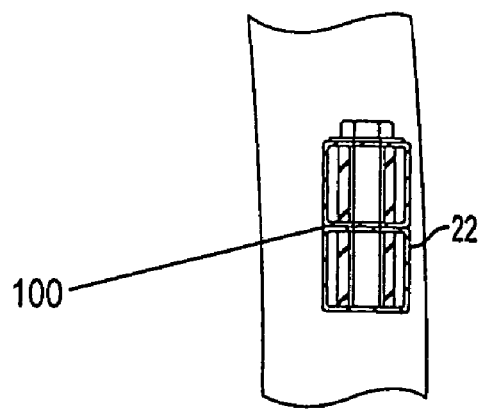
FIG. 3C shows the assembly of the cab/sleeper unit and the roof member of the modular cab/sleeper/roof structural assembly according to the present invention.
Figure 3D:
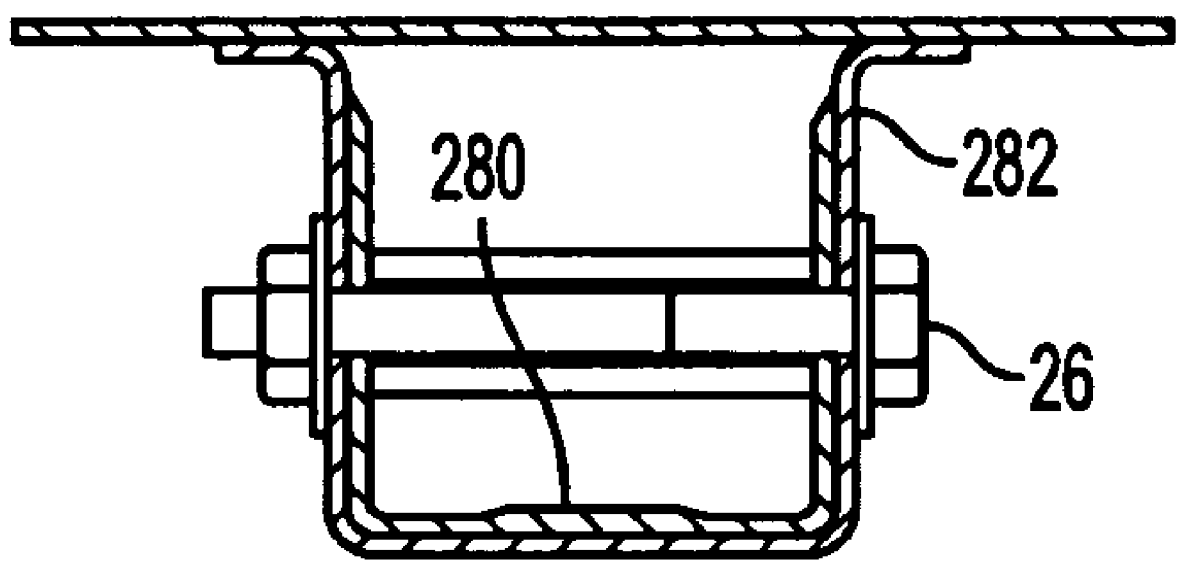
FIG. 3D shows the assembly of extended sleeper sills to cab floor sills of the cab/sleeper/roof structural assembly according to the present invention.

The extended sill arrangement as illustrated in FIG. 3D provides more strength across the cab-to-sleeper joint for a given structure weight. Several fasteners 26 connect the extended sleeper sill 280 to the cab floor sill structure 282 in an over-lap zone. As illustrated in FIG. 2, the extended sills 20 extend forward towards the cab module floor sills 24 and overlap them when the sleeper module 14 is aligned and joined to the cab module 12.

As best seen in FIGS. 3A through 3C, bolts 18, 20, 22 are the preferred removable fastening fasteners for securing the cab module 12 and the sleeper module 14, and the opened carriage assembly (e.g., assembled cab module 12 and sleeper module 14) and the roof member 16. It will be appreciated by those skilled in the art that other removable type fasteners can be employed such as of the removable clamping-type. While the removable fastening fasteners is the preferred method of fastening or fixedly joining the units together, it is possible to utilize a nut and bolt fastening for the cab module 12, the sleeper module 14, and the roof module 16. A structural adhesive in combination with bolts or fasteners may be used to join the modules together as well.

The bolts 18 (FIG. 3A) secure the opposing side walls 12b, 12c of the cab module 12 and the opposing side walls 14b, 14c of the sleeper module 14. The bolts 18 are spaced evenly between the contact surfaces of the side walls of the assembled cab and sleeper units 12, 14. The bolts 20 (FIG. 3B) secure the bottom portion of the cab module 12 and the bottom portion 14d of the sleeper module 14. Similarly, the bolts 20 are spaced evenly between the contact surfaces of the bottom portion of the assembled cab and sleeper units 12, 14. The assembled cab and sleeper unit forms the opened carriage assembly.

The bolts 22 (FIG. 3C) secure the roof member 16 to the opened carriage assembly. It will be appreciated by those skilled in the art that other joining means can be employed in the present invention to attach the roof member 16 to the opened carriage assembly, such as a structural adhesive (not shown), a structural adhesive in combination with bolts 22, or the like. As illustrated in FIGS. 1 and 2, the front portion 16b of the roof member 16 is connected to the front wall 12a of the cab module 12, the rear portion 16e of the roof member 16 is connected to the rear wall 14a of the sleeper module 14, and the opposing side portions 16c, 16d of the roof member 16 are connected to the opposing side walls 12b, 14b, 12c, 14c of the cab module 12 and the sleeper module 14, respectively. The assembled cab module 12, sleeper module 14 and roof member 16 constitute a durable, integral modular truck cab/sleeper/roof unit.

Since the opening between the cab module 12 and the sleeper module 14 is relatively devoid of obstructions (e.g., flanges), access between the cab module 12 and the sleeper module 14 is unrestricted. Further, maximum use of the living space is available within the cab/sleeper unit.

Figure 4:
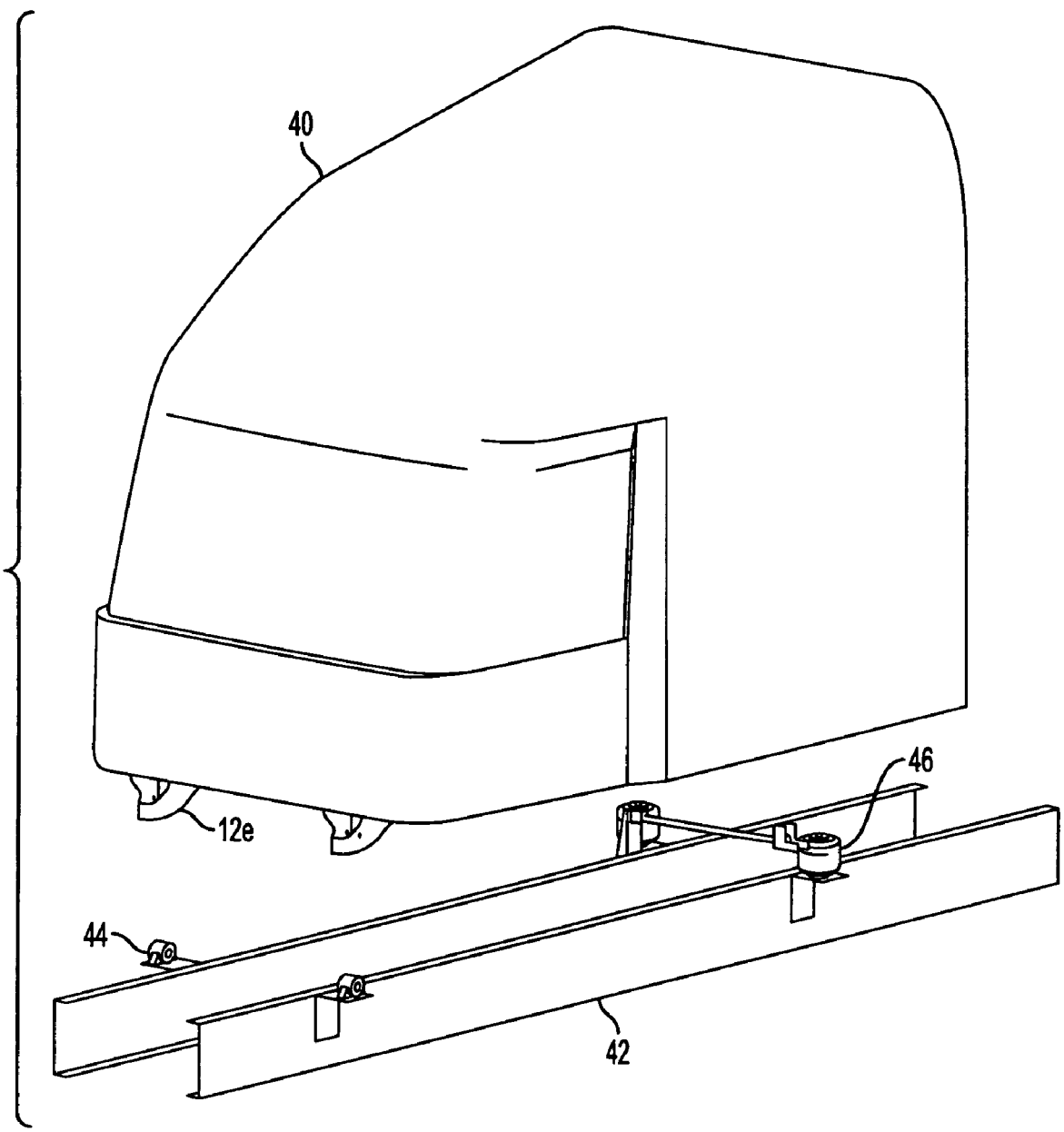
FIG. 4 is a side elevation view of the modular cab/sleeper/roof structural assembly constructed in accordance with the present invention.

Referring to FIG. 4, the modular cab/sleeper/roof structural assembly 40 constructed in accordance with the present invention can be mounted to a chassis frame member 42. The chassis frame member 42 extends longitudinal to the truck-tractor vehicle, and includes front cab mounts 44 and rear cab mounts 46. The front cab mounts 44 include elastomeric bushing, and the rear cab mounts 46 include pneumatic springs, hydraulic dampers and a track bar.

It will be appreciated by those skilled in the art that other cab mounts can be employed. For example, pneumatic springs with hydraulic dampers can be utilized as front mounts, and various types of mechanical springs (e.g., coil, leaf, elastomeric, torsion) with hydraulic dampers can be utilized as rear mounts. Further, passive systems such as "hydro elastic" which are oil in a rubber cushion or bag, semi-active systems such as "hydro elastic" which are oil in a rubber cushion or bag with fluid valve control, and active systems such as "hydro elastic" which are oil in rubber cushion or bag with fluid valve control and fluid pressure control to react accordingly to situations can be employed in the present invention. A torsion bar can also be employed on basic systems to limit side motion.

Front connectors 12e of the cab module 12 are secured to the front cab mounts 44 of the chassis frame 42, and rear connectors (not shown) of the sleeper module 14 are secured to the rear cab mounts 46 of the chassis frame 42.

Figure 5:
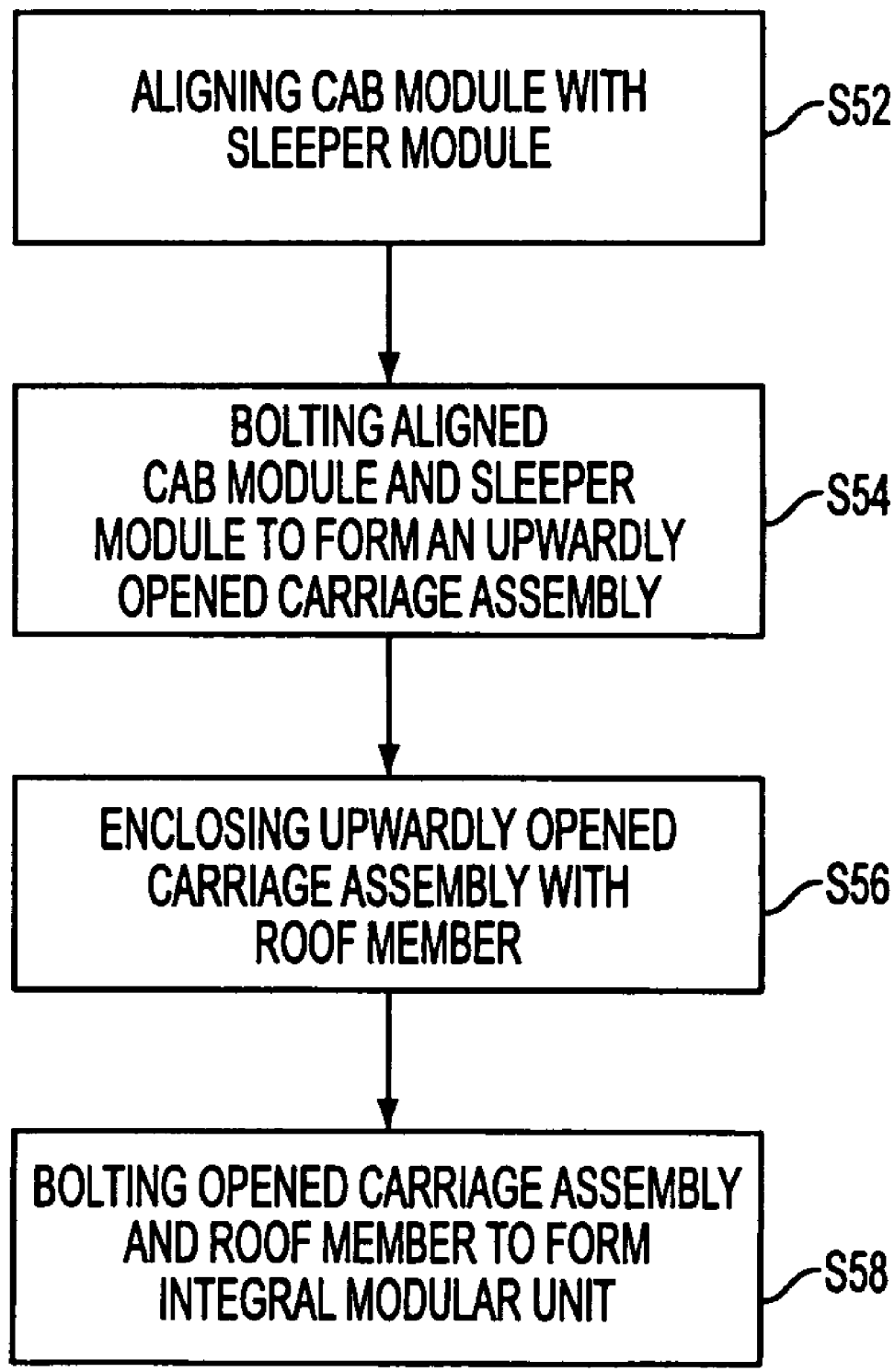
FIG. 5 is a diagram illustrating the steps of an exemplary embodiment of the present invention.

As illustrated in FIG. 5, the cab module 12, the sleeper module 14 and the roof 16 may be coupled together in accordance with the present invention by aligning the cab module 12 with the sleeper module 14 in step S52; bolting the aligned cab module 12 and the sleeper module 14 to form an upwardly opened carriage assembly in step S54; enclosing the upwardly opened carriage assembly with the roof member 16 in step S56; bolting and/or bonding the opened carriage assembly and the roof member 16 to form an integral modular unit in step S58.

By providing a cab/sleeper/roof structural assembly according to the present invention, a sleeper can be easily removed by unbolting the sleeper from the cab. The easy removal of the sleeper will also facilitate the retrofitting of the modular cab from a sleeper configuration to a day cab configuration by the bolting of a panel/panel assembly to close the back of the cab and a new roof which will close off the top of the cab. This offers a second life potential for the cab and sleeper for those who want a used day cab instead of a used sleeper, thus leading to increased resale value for the modular cab. Further, various sizes of sleepers (and sleeper and roof variations) can be matched to a cab at a final assembly location, without fabricating either the cab or the sleeper at that location. The cab or the sleeper could be, for example, assembled at a location remote from the place of final assembly by an independent contractor, or at another plant, and then delivered to the final assembly location. This offers greater manufacturing flexibility than would a cab or sleeper that was fabricated at the final assembly location from side walls and a rear wall.

Further, manufacturing costs are significantly reduced since individual cab and sleeper modules may be dressed offline, and then assembled, allowing the amount of trim and padding, for example, that needs to be installed during final assembly to be reduced. It may be easier to dress the cab and sleeper modules offline since they are open at the top and through the interface prior to assembly. This allows assembly workers to be more productive than they would be if they had to crawl through the door of an already assembled cab/sleeper to install interior trim, and it may allow automated equipment to be used more easily during the trim operation.

The foregoing has described the principles, embodiments, and modes of operation of the present invention. However, the invention should not be construed as being limited to the particular embodiments described above, as they should be regarded as being illustrative and not as restrictive. It should be appreciated that variations may be made in those embodiments by those skilled in the art without departing from the scope of the present invention.

While a preferred embodiment of the present invention has been described above, it should be understood that it has been presented by way of example only, and not limitation. Thus, the breadth and scope of the present invention should not be limited by the above described exemplary embodiment.

Obviously, numerous modifications and variations of the present invention are possible in light of the above teachings. It is therefore to be understood that the invention may be practiced otherwise than as specifically described herein.

What is claimed is:

1. A method of assembling a top-free cab unit, a top-free sleeper unit and a roof member to form a modular cab/sleeper/roof structural assembly for a truck-tractor vehicle, said method comprising the steps of:
    providing a top-free cab unit having a front wall, opposing side walls, and a bottom portion, the bottom portion having sills;
    providing a top-free sleeper unit having a rear wall, opposing side walls, and a bottom portion, the bottom portion having sills;
    aligning an open rear portion of said cab unit with an open front portion of said sleeper unit, the sills of the cab unit bottom portion overlapping the sills of the sleeper unit bottom portion;
    fixedly joining the aligned cab unit and sleeper unit to form an upwardly open carriage assembly including fastening overlapping parts of the sills of the cab unit bottom portion and the sills of the sleeper unit bottom portion;
    enclosing said upwardly open carriage assembly with a roof member; and
    fixedly joining said upwardly open carriage assembly and said roof member to form an integral modular unit.

2. The method of claim 1, further comprising connecting said integral modular unit to a chassis member.

3. A method of assembling a top-free cab unit, a top-free sleeper unit and a roof member to form a modular cab/sleeper/roof structural assembly for a truck-tractor vehicle, said method comprising the steps of:
    providing a top-free cab unit having a front wall, opposing side walls, and a bottom floor portion;
    providing a top-free sleeper unit having a rear wall, opposing side walls, and a bottom floor portion;
    aligning an open rear portion of said cab unit with an open front portion of said sleeper unit, wherein the respective bottom floor portions and respective side walls are placed in contact;
    fixedly joining the aligned cab unit and sleeper unit to form a carriage assembly having an upwardly facing opening; and,
    fixedly joining said roof member at the upwardly facing opening of said carriage assembly to form an integral modular unit capable of being mounted as a unit on a chassis.

* * * * *